United States Patent [19]

Fukushima

[11] 4,406,344
[45] Sep. 27, 1983

[54] METHOD AND APPARATUS FOR REDUCING ENGINE VIBRATION INDUCED VEHICLE CABIN NOISE AND/OR RESONANCE

[75] Inventor: Masao Fukushima, Fuchu, Japan

[73] Assignee: Nissan Motor Co., Ltd., Yokohama, Japan

[21] Appl. No.: 237,621

[22] Filed: Feb. 24, 1981

[30] Foreign Application Priority Data

Feb. 29, 1980 [JP] Japan .................. 55-25972

[51] Int. Cl.³ .............................................. B60K 9/00
[52] U.S. Cl. .................................... 180/300; 188/379;
248/559; 267/63 R; 267/63 A; 267/141;
267/141.1
[58] Field of Search ........... 188/379; 267/63 R, 63 A,
267/153, 140.3, 141, 141.1, 35; 248/559, 621,
620, 619, 607, 605; 180/300, 312, 297

[56] References Cited

U.S. PATENT DOCUMENTS

| 1,840,080 | 1/1932 | Breer. | |
|---|---|---|---|
| 1,949,064 | 2/1934 | Nathan. | |
| 2,066,187 | 12/1936 | Piron | 267/63 A X |
| 2,380,672 | 7/1945 | Opitz | 267/63 A X |
| 3,211,491 | 10/1965 | Browne et al. | 267/63 A X |
| 3,322,379 | 5/1967 | Flannelly | 248/20 |
| 3,353,771 | 11/1967 | TeBow. | |
| 3,764,100 | 10/1973 | Young et al. | 267/141.3 |
| 3,791,676 | 2/1974 | Spratlen | 280/475 |
| 4,010,940 | 3/1977 | Freyler | 267/153 X |
| 4,240,517 | 12/1980 | Harlow, Jr. et al. | 180/297 X |
| 4,274,510 | 6/1981 | Mouille | 188/1 B |

FOREIGN PATENT DOCUMENTS

| 1630400 | 6/1971 | Fed. Rep. of Germany. |
|---|---|---|
| 2019546 | 11/1971 | Fed. Rep. of Germany. |
| 2408956 | 9/1975 | Fed. Rep. of Germany. |
| 2292153 | 6/1976 | France. |
| 54-55215 | 2/1979 | Japan. |
| 852706 | 10/1960 | United Kingdom. |
| 981853 | 1/1965 | United Kingdom. |
| 1115377 | 5/1965 | United Kingdom. |
| 1200191 | 7/1970 | United Kingdom. |

Primary Examiner—Robert J. Spar
Assistant Examiner—Donald W. Underwood
Attorney, Agent, or Firm—Thompson, Birch, Gauthier & Samuels

[57] ABSTRACT

An engine mounting buffer rod is constructed to constitute two suspended masses interconnected by elastomeric means to endow on the rod two resonance frequencies. The resonance frequencies are selected to span the vibrational range in which resonance noise is apt to occur in the vehicle cabin so that a first change in the phase of vibration passing through the buffer rod causes an interference with the vibration passing through the main engine mounting brackets to soften the mounting arrangement as a whole and absorb vibrations which would otherwise induce cabin resonance noise. The effect of the second resonance overlaps the first to prolong the softening effect until the second phase change induced thereby occurs.

9 Claims, 14 Drawing Figures

FIG.14

METHOD AND APPARATUS FOR REDUCING ENGINE VIBRATION INDUCED VEHICLE CABIN NOISE AND/OR RESONANCE

BACKGROUND OF THE INVENTION

1. Field of the Invention

The present invention relates generally to an automotive vehicle and more particularly to an arrangement for mounting the engine on the chassis thereof so that engine vibration induced resonance within the cabin is reduced.

2. Description of the Prior Art

In a known arrangement, a buffer rod has been added to the normal engine mounting arrangement for increasing the stiffness of the engine mounting in an effort to reduce the vibration transmitted to the vehicle body from the engine, which vibration tends to induce annoying noise and/or resonance within the vehicle cabin during frequently used middle engine speed operating conditions. However, this arrangement has failed to be effective in that, to avoid the buffer rod per se from unwantedly resonating during middle and high speed operation, it is necessary to select the vibrational characteristics so that the resonance frequency thereof is above the maximum frequency of the vibration from the engine during high speed operation, which in turn has lead to the phenomenon that the vibrational force transmitted to the vehicle body through the normal engine mounts and through the buffer rod re-enforce each other to actually increase the noise and/or resonance within the vehicle cabin. Accordingly, it has been necessary to increase the mass and the size of the elastomeric members used in the engine mountings, which in turn, makes the disposition of same within a crowded engine compartment difficult and increases the overall weight of the vehicle. Further, this measure has proven to be only partly effective.

SUMMARY OF THE INVENTION

In general terms, the present invention features a buffer rod which provides a dynamic damping effect. The rod has two resonance frequencies, the first of which is slightly lower than the engine vibration frequency whereat resonance noise within the vehicle cabin is apt to begin, while the second is closed to the maximum vibration frequency of the engine. The dynamic damping phenomenon is brought about by a first change in phase of the vibration transmitted by the buffer rod at or about its first resonance frequency, whereby during engine operation which produces low frequency vibration (viz., shaking), the buffer rod functions to increase the rigidity of the engine mounting arrangement as a whole until the engine vibration frequency approaches and/or exceeds the first frequency at which the buffer rod resonates. The rod then functions to reduce the rigidity of the engine mounting arrangement as a whole and induce suitable conditions for preventing the transmission of higher frequency vibrations which produce sound. More specifically, the change in the phase of vibration transmitted through the buffer rod at or about its first resonance frequency causes the vibration transmitted through the engine mounts per se and the vibration transmitted through the buffer rod to combine to offset each other just prior to the frequency at which the vehicle cabin will be subject to resonance noise. This phenomenon is maintained by the effect of the second resonance overlapping the first, and continues until the engine vibration frequency approaches and/or reaches the second resonance frequency when a second phase change occurs. This second phase change increases the rigidity of the engine mounting arrangement as a whole, but occurs above normally experienced frequencies and/or near the maximum engine frequency, so that highly improved engine vibration damping is achieved throughout low, middle and substantially all high speed vehicle operations, notably improving the vehicle cabin environment during same.

It is therefore an object of the present invention to provide a buffer rod which will vary the spring modulus of the engine mounting arrangement as a whole during a selected frequency range, and accordingly reduce the generation of resonance noise in the vehicle cabin without the need of overly large elastomeric insulators in the main engine supporting brackets.

In more specific terms, the present invention is a suspension system for mounting an engine on a chassis comprising: at least one engine mount having an elastomeric insulating member interposed between said engine and said chassis; and means defining a dynamic damper mechanism having first and second resonance frequencies, said dynamic damping mechanisim interconnecting said engine and said chassis for cooperating with said at least one engine mount so that when said engine vibrates with a frequency lower than a first predetermined engine vibration frequency which is substantially equal to said first resonance frequency, the effective spring modulus of said elastomeric insulating member and said dynamic damper mechanism is increased, and upon the engine vibration frequency approaching and/or exceeding said first predetermined engine vibration frequency, the effective spring modulus of said elastomeric insulating member and said dynamic damper mechanism is reduced until the engine vibration frequency approaches and/or reaches a second predetermined engine vibration frequency, which second engine vibration frequency is substantially equal to said second resonance frequency.

BRIEF DESCRIPTION OF THE DRAWINGS

The features and advantages of the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Turning now to FIGS. 1 to 5, a first embodiment of the present invention is shown. In these figures, an engine 10 is mounted on a chassis 12 by a plurality of main mounting brackets 14 (only one is shown). The main mounting bracket includes a mounting arm or bracket 16 fixedly secured to the engine 10, an elastomeric insulator 18 and "L" shaped plates 20 disposed on either side of the insulator 18 and interposed between the arm and the chassis.

A buffer rod 22 is connected at one end to the mounting arm 16 and at the other end to the chassis 12. The buffer rod 22 comprises two essentially identical halves 24, 24, one of which is clearly shown in FIG. 5. Each half comprises a bracket 28 having a cylindrical housing member 30 fixed to one end thereof in which a first annular elastomeric insulator 32 is disposed. A cylindrical sleeve 34 is snugly disposed through the annular insulator member 32. A second insulator 38 is fixedly connected by bonding, vulcanizing or the like at one face to the other end of the bracket, and in turn has a plate 40 fixedly connected to an opposite face thereof by a similar technique. This plate carries a threaded shaft 42 thereon which projects essentially at a right angle with respect to the plate. The bracket is also formed with an elongated slot 44 therein for receiving therethrough the threaded shaft of the corresponding half.

Figure 1:
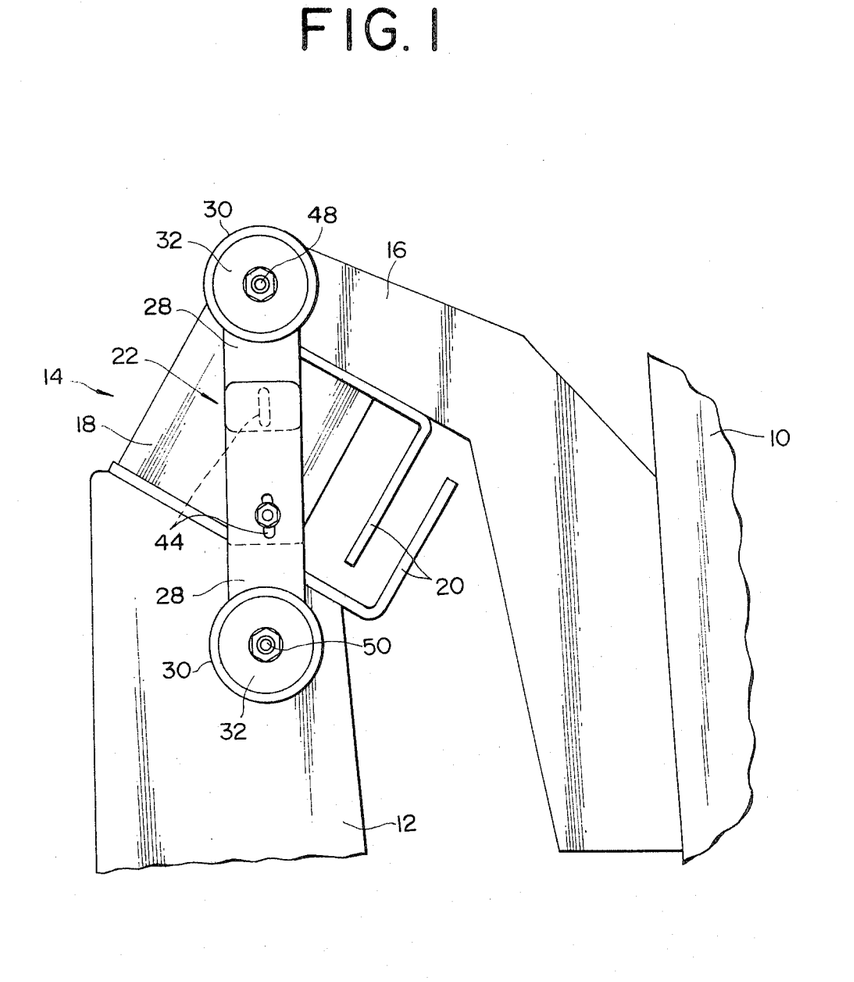
FIG. 1 is a front elevational view of a first embodiment of the present invention shown operatively interconnecting an engine and a chassis on which the engine is mounted.
Figure 2:
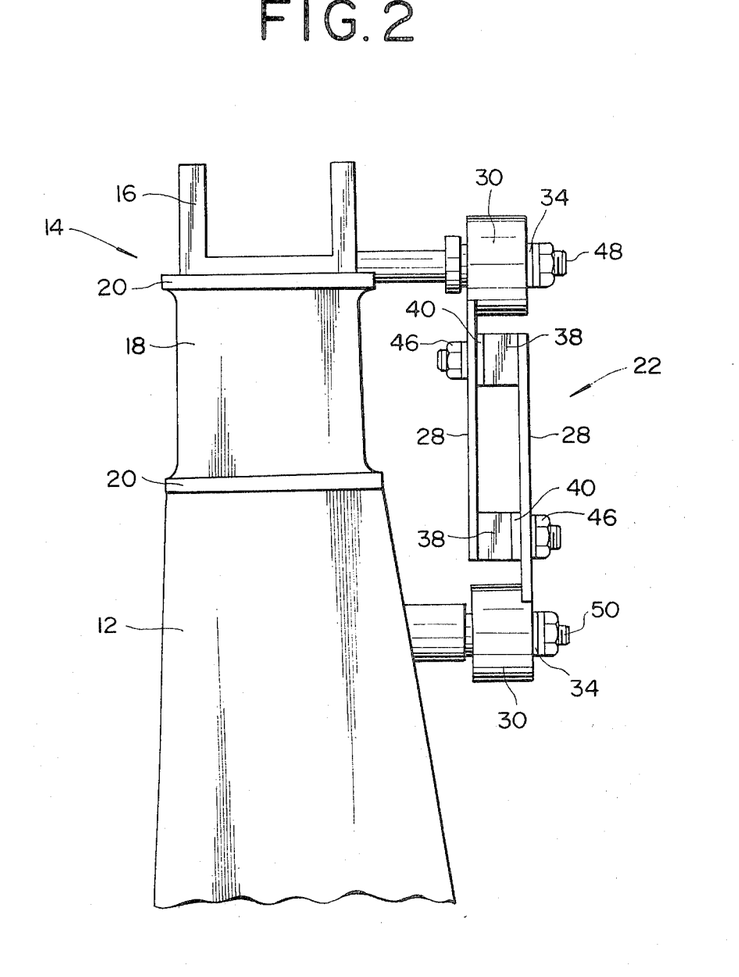
FIG. 2 is a side elevational view of the arrangement shown in FIG. 1.
Figure 3:
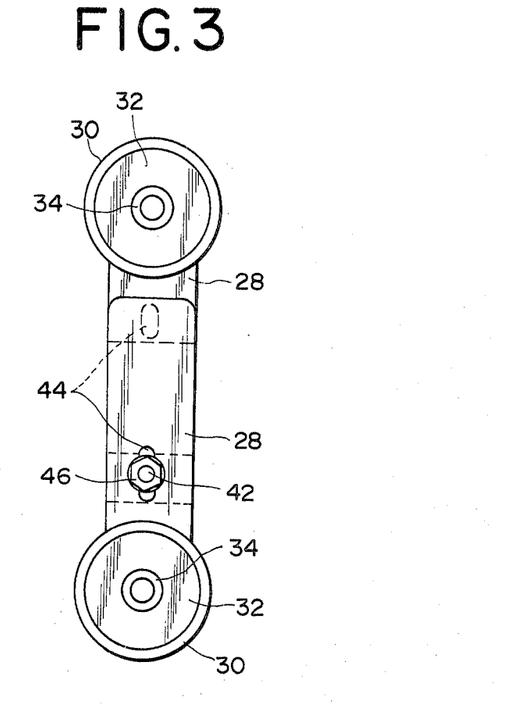
FIGS. 3 and 4 are respective front and side elevational view of the buffer rod according to the first embodiment of the present invention.
Figure 4:
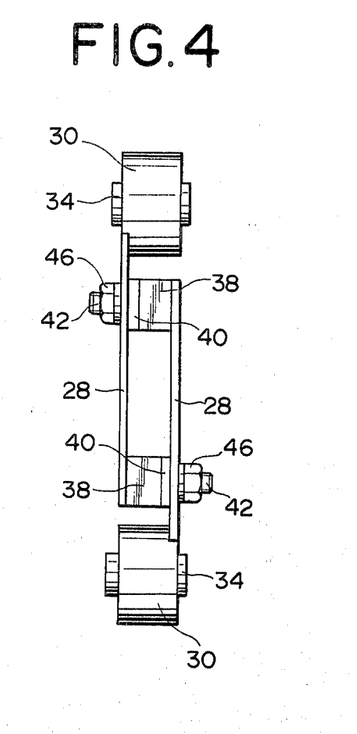
Figure 5:
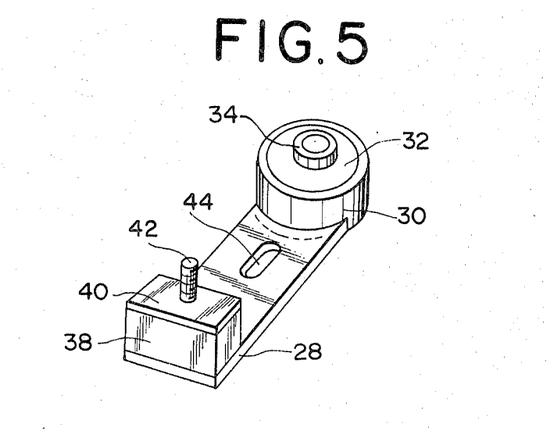
FIG. 5 is a perspective view of a part of the buffer rod shown in FIGS. 1 to 4.

The buffer rod is thus formed by inverting the halves and fastening same together as best shown in FIGS. 3 and 4, by applying nuts 46 to each of the threaded shafts. Subsequently, the buffer rod 22 is mounted between the engine and the chassis by connecting bolts 48 and 50, as shown in FIGS. 1 and 2.

Figure 6:
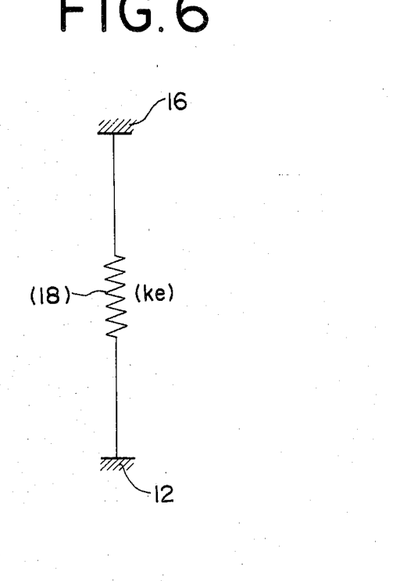
FIGS. 6 and 7 show functional models of the main engine mounting bracket and the buffer rod, respectively.
Figure 7:
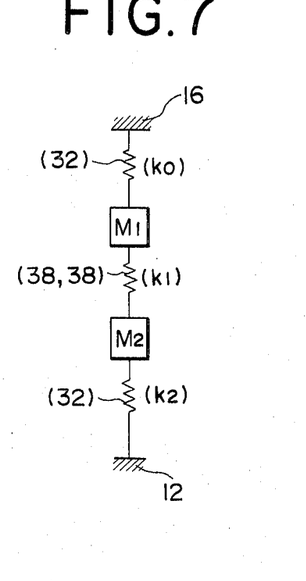
Figure 8:
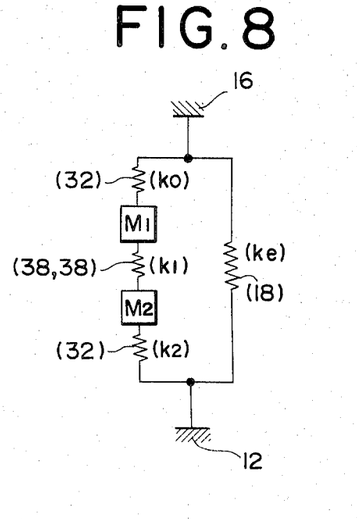
FIG. 8 shows a functional model of the engine mounting arrangement as a whole, viz., the combination of the main engine mounting bracket and the buffer rod.

FIGS. 6, 7 and 8 show, respectively, functional models of the main engine mounting bracket, the buffer rod and the combination of the buffer rod and the main engine mounting bracket.

In FIG. 6, the spring represents the elastomeric insulator 18. Under the conditions that this spring member is displaced through a distance (x) at a given frequency (f), and given that the damping effect of the elastomeric insulator is ignored, then the force (Fe) exerted at the points of connection to the engine and the chassis can be expressed by the following equation, $$Fe = ke \cdot x$$

where ke is the spring modulus of the elastomeric insulator 18.

In FIG. 7, the masses $M_1$ and $M_2$ each represent the combined mass of a bracket 28, a cylindrical housing 30, a plate 40, a threaded shaft 42 and a nut 46. The spring member interconnecting the two masses and having a spring modulus of ($k_1$) represents the two second insulators 38, while the upper and lower springs (spring moduli $k_0$ and $k_2$ respectively) each represent an annular insulator 32.

Thus, when the buffer rod is subject to conditions which induce a displacement of (x) at a given frequency (f), the force (Fs) occuring at the points of connection to the engine and the chassis can be expressed by the following equation:

$$Fs = \frac{1}{\frac{M_1 \cdot M_2 \cdot \omega^4}{k_0 \cdot k_1 \cdot k_2} - \frac{M_1}{k_0 k_1} + \frac{M_1}{k_0 k_2} + \frac{M_2}{k_0 k_2} + \frac{M_2 \omega^2}{k_1 k_2} + \frac{1}{k_0} + \frac{1}{k_1} + \frac{1}{k_2}} \cdot x$$

where $\omega = 2\pi f$

Figure 9:
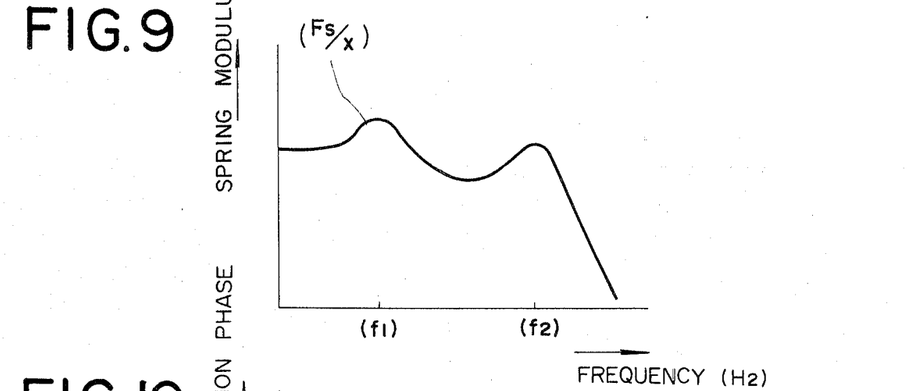
FIG. 9 is a graph showing the change in spring modulus of the buffer rod with respect to the frequency of vibration passing therethrough.
Figure 10:
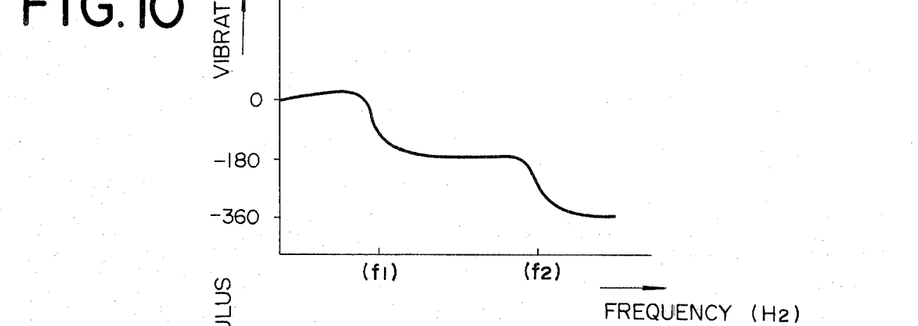
FIG. 10 is a graph showing the change in phase of vibration passing through the buffer rod with respect to frequency.
Figure 11:
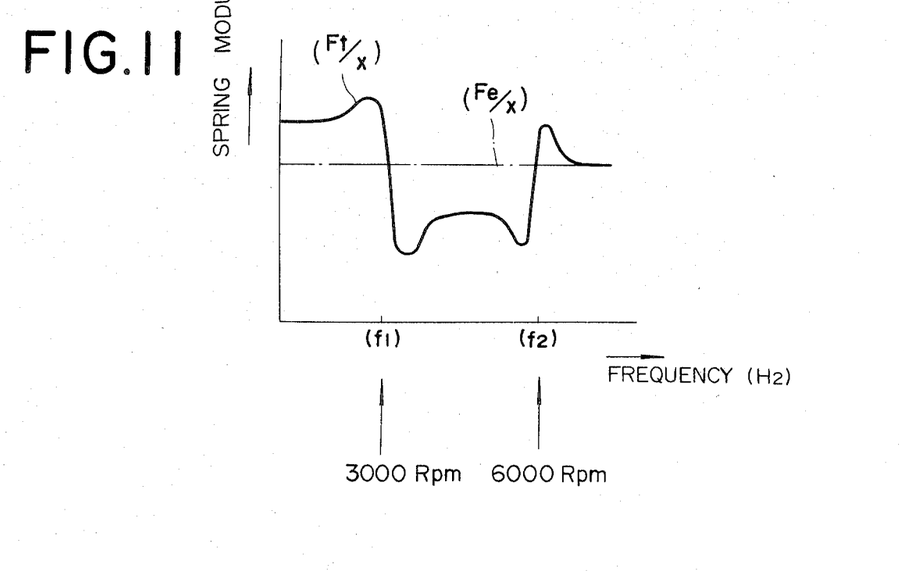
FIG. 11 is a graph showing the change of spring modulus of the engine mounting arrangement as a whole with respect to frequency.

FIG. 8 shows a model which represents the engine mounting arrangement as a whole, viz., the combination of the main engine mounting and the buffer rod. As seen in FIG. 9, the spring modulus (Fs/x) of the buffer rod varies with frequency. Further, due to the presence of the two suspended masses $M_1$ and $M_2$, the buffer rod has two resonance points. As shown by the curve in FIG. 9, at the resonance points which respectively occur at ($f_1$) and ($f_2$), the spring modulus of the buffer rod tends to maximize. However, as shown in FIG. 10, at the first resonance point, the vibration passing through the buffer rod undergoes a 180 degree phase change. At the second resonance point the vibration undergoes another 180 degree phase change. The effect of the first phase change is to cause the vibration passing through the main engine mounting bracket and the buffer rod to interfere, with one another and to induce a sudden reduction in the effective spring modulus (Ft/x), "softening", of the engine mounting arrangement as a whole. Prior to the first phase change, the rod and the main engine mounting bracket re-enforce each other, as would normally be expected. Subsequent to the sudden "softening" of the engine mounting arrangement as a whole, the spring modulus tends to slowly increase, however, due to the overlapping effect of the second buffer rod resonance, and the spring modulus as a whole again softens until at the second phase change, the interference between the vibrations ceases and the spring modulus suddenly increases to almost its orignal level.

Using the functional models, it can be shown that where the spring moduli of the annular insulators ($k_0$ and $k_2$) are equal and the mass $M_1 = M_2$, then $$f_1 = \frac{1}{2\pi} \sqrt{\frac{k}{M}}$$

and $$f_2 = \frac{1}{2\pi} \sqrt{\frac{k + 2k_1}{M}}$$

where $k = k_0 = k_2$ and $M = M_1 = M_2$

Hence, by using the two above equations it is possible to select the masses and spring moduli so that ($f_1$) and ($f_2$) span the frequency range in which resonance noise is apt to occur within the vehicle cabin, particularly when the vehicle is running at high speed.

For example, in the case of a four cylinder engine, if ($f_1$) is selected to fall within the range of 90 to 140 Hz, while ($f_2$) is selected to be greater than 200 Hz, viz., if $f_1=100$ Hz (approximately the frequency at which the engine vibrates at 3000 RPM), $f_2=220$ Hz (approximately the frequency at which the engine vibrates at 6000 RPM), $k=8.06$ Kg/mm and $k_1=15.47$ Kg./mm, the level of resonance noise between engine speeds of 3000 RPM and 6000 RPM is notably reduced. In addition, by using a buffer rod having the above mass and spring constant characteristics, engine vibration at very low frequencies (viz., 10 Hz) is prevented from being transmitted to the vehicle body.

Figure 12:
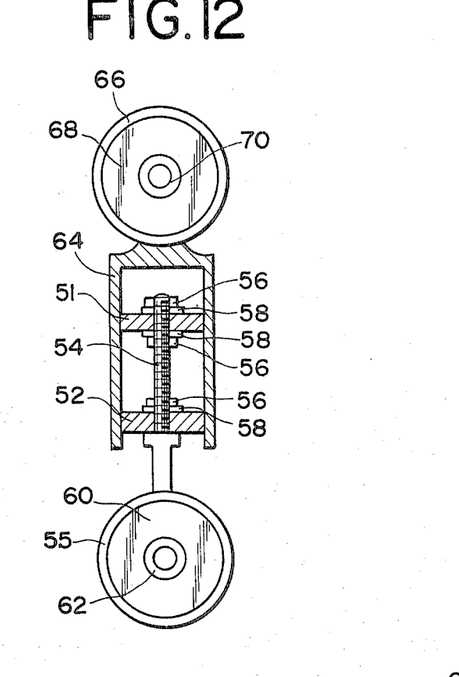
FIGS. 12 and 13 are respective front and side elevational views of a second embodiment of the present invention.
Figure 13:
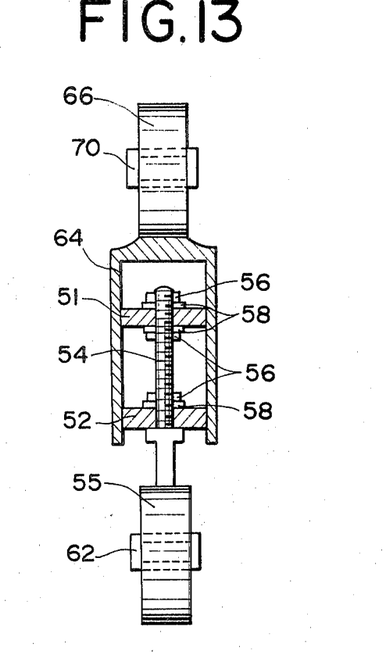
Figure 14:
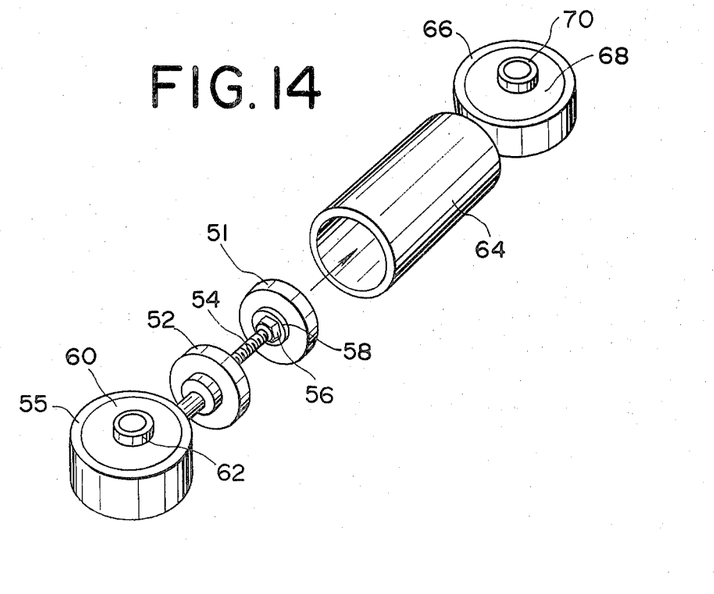
FIG. 14 is an exploded view of the arrangement shown in FIGS. 12 and 13.

FIGS. 12 to 14 show a second embodiment of the present invention. In this arrangement, two elastomeric discs 51, 52 are secured to a threaded shaft 54 fixedly connected to a cylindrical housing member 55. Each elastomeric disc is clamped between nuts 56 and washers 58 and thus secured in the illustrated position. An annular elastomeric insulator 60 is disposed within the cylindrical housing member 55, and a cylindrical sleeve 62 is disposed snugly therethrough. Snugly disposed about and enclosing the elastomeric discs 51 and 52, is a cylinder 64 which, in turn, is fixedly connected to a second cylindrical housing 66 which receives a second annular elastomeric insulator 68 and second cylindrical sleeve 70.

With this arrangement, mass $M_1$ takes the form of the cylinder 64 and cylindrical housing 66 while mass $M_2$ takes the form of the threaded shaft 54, nuts and washers 56, and 58 plus the cylindrical housing 55. Due to the snug fit of the elastomeric discs 51, 52 in the cylinder 64, the discs grip the inner surface of the cylinder and establish a suitable working connection therebetween and thus define a model such as found in FIG. 7.

The function of this embodiment is essentially the same as the first but with the exceptions that that masses $M_1$ and $M_2$ need not be equal and that due to the friction fitting of the discs 51, 52 within the cylinder additional vibration may be absorbed by the sliding of the discs within the cylinder. Further, the slidability of the discs within the cylinder also eliminates the need for a separate device for adjusting the length of the buffer rod when fitted to the vehicle.

Thus in summary, the buffer rod interconnects an engine and a vehicle chassis in addition to the main engine mounts, and has a first resonance frequency slightly lower than the engine vibration frequency at which resonance in the vehicle cabin is apt to begin, and a second near the maximum engine vibration frequency. Upon approaching and/or reaching the first resonance frequency the phase of vibration passing through the rod changes so that instead of increasing the spring modulus of the combination of engine mounts and buffer rod to damp vibrations which would otherwise shake the vehicle, the spring modulus thereof is reduced to a very low value due to the interference between the vibration passing through the mounts and the buffer rod. This sudden softening of the engine suspension as a whole, damps the engine vibration which would otherwise induce resonance in the vehicle cabin. This softening effect is maintained until the engine vibration frequency reaches the second resonance frequency whereupon a second phase change occurs.

What is claimed is:

1. A suspension system for mounting an engine on a chassis, comprising:
    at least one engine mount having an elastometric insulating member interposed between said engine and said chassis; and
    a frequency responsive dynamic damping means independent of said at least one engine mount having first and second resonance frequencies, said dynamic damping means interconnecting said engine and said chassis for
    (a) increasing the effective spring modulus of said suspension system when said engine vibrates with a frequency lower than a first predetermined engine vibration frequency which is substantially equal to said first resonance frequency,
    (b) reducing said spring modulus to a predetermined low level when the engine vibration frequency approaches and/or exceeds said first predetermined engine vibration frequency, and
    (c) maintaining said effective spring modulus at said predetermined low level until the engine vibration frequency approaches and/or reaches a second predetermined engine vibration frequency, which second engine vibration frequency is substantially equal to said second resonance frequency.

2. A suspension system as claimed in claim 1, wherein said dynamic damping means means is a buffer rod comprised of first and second bodies interconnected by elastomeric connection means, said first body being connected to said engine through a first elastomeric insulator and said second body being connected to said chassis through a second elastomeric insulator, said first and second bodies, said first and second elastomeric insulators and said elastomeric connection means having masses and spring moduli respectively which cause said first resonance frequency to be substantially equal to said first predetermined engine frequency and said second resonance frequency substantially to be equal to said second predetermined engine vibration frequency.

3. A suspension system as claimed in claim 2, wherein said buffer rod is comprised of two essentially identical members which can be releasably fastened together.

4. A suspension system as claimed in claim 3, wherein each of said members carries an elastomeric block, the combination of the two elastomeric blocks when the two members are fastened together defining said elastomeric connection means.

5. A suspension system as claimed in claim 2, wherein said buffer rod comprises a first member which takes the form of a cylinder and a second member in the form of a shaft having at least one annular elastomeric disc thereon, said second member being telescopically disposed in said first member so that said at least one annular elastomeric disc frictionally engages the inner wall of said cylinder to establish an operative connection therebetween, said at least one annular elastomeric disc defining said elastomeric connection means.

6. A method of suspending an engine on a chassis comprising the steps of:
    mounting said engine to said chassis by using at least one engine mount in which an elastomeric insulating member is interposed between said engine and said chassis;
    interconnecting said engine and said chassis with a dynamic damping mechanism which is independent of said at least one engine mount;

utilizing said dynamic damping mechanism for increasing the effective spring modulus of said elastomeric insulating member and said dynamic damping mechanism when said engine vibrates with a frequency lower than a first predetermined engine vibration frequency;

utilizating said dynamic damping mechanism for reducing the effective spring modulus of said elastomeric insulating member and said dynamic mechanism upon the engine vibration frequency approaching and/or exceeding said first predetermined engine vibration frequency; and maintaining said reducing effect until the engine vibration frequency approaches and/or reaches a second predetermined engine vibration frequency.

7. A method as claimed in claim 6, wherein said dynamic damping mechanism takes the form of a buffer rod having first and second bodies interconnected by elastomeric connection means, said first body being suspendedly connected through a first elastomeric insulator to said engine, and said body being connected through a second elastomeric insulator to said chassis, and wherein said method further comprises the step of:

selecting the masses of said first and second bodies and the spring moduli of said first and second elastomeric insulators and said elastomeric connection means so that the buffer rod has a first resonance frequency substantially equal to said first predetermined engine vibration frequency and a second resonance frequency substantially equal to said second predetermined engine vibration frequency.

8. In a vehicle having an engine and a chassis, suspension means having a predetermined effective spring modulus for suspending said engine on said chassis;

means for increasing said effective spring modulus when said engine vibrates with a frequency lower than a first predetermined frequency;

means for reducing said spring modulus to a predetermined low level when said engine vibrates at a frequency equal to or greater than said predetermined frequency; and means for maintaining said spring modulus at said predetermined low level until said engine vibrates with a frequency equal to or greater than a second predetermined frequency.

9. In a vehicle having an engine and a chassis, a suspension system for supporting said engine on said chassis and which has a predetermined effective spring modulus, comprising:

means defining a first vibration transmission path between said engine and said chassis, said first vibration path including an engine mount having an elastomeric insulating member interposed between said engine and said chassis; and means defining a second vibration path between said engine and said chassis, said second vibration transmission path including means for (a) inducing a first phase change in the vibration transmitted therethrough at a first predetermined frequency, said first vibration phase change causing said effective spring modulus to reduce from a first value to a relatively low value, and for (b) inducing a second phase change in the vibration transmitted therethrough at a second predetermined frequency, said second phase change causing said effective spring modulus to increase from said relatively low level toward said first value.

* * * * *